United States Patent [19]

Feurer et al.

[11] Patent Number: 4,495,117

[45] Date of Patent: Jan. 22, 1985

[54] METHOD FOR THE MANUFACTURE OF CONTACT LENSES USING MICROWAVE ENERGY

[75] Inventors: Bernard Feurer, Montgiscard; Gilles Pigot, Toulouse, both of France

[73] Assignee: Alcon Pharmaceuticals, Limited, Cham, Switzerland

[21] Appl. No.: 476,385

[22] Filed: Mar. 17, 1983

[30] Foreign Application Priority Data

Mar. 17, 1982 [FR] France .................. 82 04663

[51] Int. Cl.³ .................................. B29D 11/00
[52] U.S. Cl. ........................ 264/1.4; 264/23; 264/25; 425/174.2; 425/808
[58] Field of Search ............ 264/1.4, 1.1, 2.2, 25, 264/23, 26; 425/808, 174.4, 174.2; 350/410, 409, 417; 351/177

[56] References Cited

U.S. PATENT DOCUMENTS

| | | | |
|---|---|---|---|
| 3,263,005 | 7/1966 | Emerick | 264/2.2 |
| 3,732,048 | 5/1973 | Guerga et al. | 425/174.4 |
| 4,144,434 | 3/1979 | Chiron et al. | 219/10.55 F |
| 4,269,581 | 5/1981 | Vry et al. | 264/25 |
| 4,382,902 | 5/1983 | Feurer | 264/1.4 |
| 4,390,482 | 6/1983 | Feurer | 264/1.4 |

OTHER PUBLICATIONS

Ency. of Chem. Tech. "Microwave Technology", vol. 15, pp. 494–522, John M. Osepchuk.

Primary Examiner—Jay H. Woo
Assistant Examiner—Michael McGurk
Attorney, Agent, or Firm—Shlesinger, Arkwright, Garvey & Fado

[57] ABSTRACT

The invention concerns a method for manufacturing a contact lens, through molding within water-tight molds. The polymerization of lenses is insured by arranging a number of molds within one or several sealed metallic chambers (9) constituting a resonant cavity of a unique mode for an ultra high frequency wave; these molds are positioned in an area of the cavity where the electromagnetic field approximately of ultra high frequency waves is homogeneous, and are distributed so that the amounts of basic composition to be polymerized act as a load fitted to the inside of said cavity.

12 Claims, 12 Drawing Figures

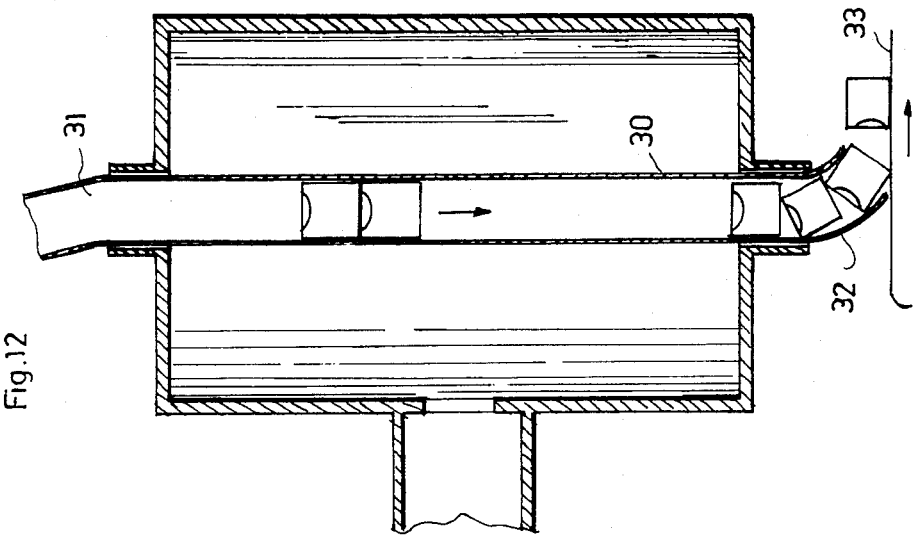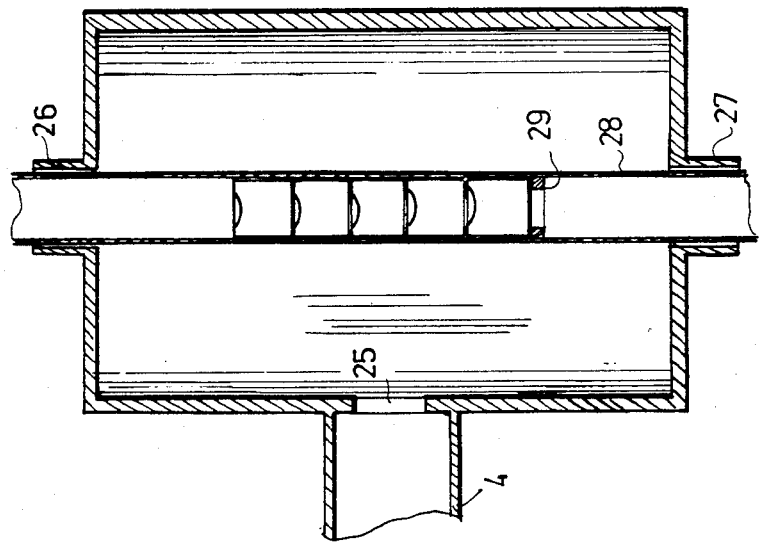

METHOD FOR THE MANUFACTURE OF CONTACT LENSES USING MICROWAVE ENERGY

The invention concerns an improved method of manufacture, through molding, of a contact lens constituting a finished product having the optical qualities required to be placed in contact with an eye and to insure the desired corrections of vision. It extends to a new apparatus for the use of this method.

The French patent application No. 80,04751 published Sept. 4, 1981 under U.S. Pat. No. 2,477,059 described a lens manufacturing process in which the lenses are made in a water-tight mold, under the proper conditions to directly lend them final form with the appropriate optical properties, without an added machining operation.

The present invention proposes improvements of this method with a view to increasing the quality of the lenses obtained.

A further objective of the invention is to reduce the needed manufacturing time and consumption of energy.

A further objective is to permit manufacture of very thin lenses, while lending these latter the appropriate optical qualities.

To that end, the method's aims consist essentially:
in constructing water-tight molds, reproducing in hollows the shape of lenses to be obtained and composed of a transparent or barely absorbent material with respect to ultra high frequency electromagnetic waves, said molds being constructed so as to possess a thermic inertia much higher than the portion of basic composition need to make a lens:
in preparing a basic composition from one or several monomers with double polymerizable bonds, having an absorbent quality with respect to ultra high frequency waves;
in insuring polymerization of the composition within the sealed molds, through irradiation by means of ultra high frequency waves.

According to the present invention, the polymerization operation is carried out by arranging several molds, each containing an amount of basic composition, within at least one sealed metallic chamber constituting a resonant cavity of a unique mode for the frequency of the ultra high frequency waves used, said molds being positioned in an area of the cavity where the electromagnetic field is approximately homogeneous and being distributed so that the amounts of basic composition contained in said molds act as a load fitted to the inside of said resonant cavity.

The molds especially used are two-part molds which fit tightly into one another.

One preferably uses a chamber possessing ring geometry, that is, a cylindrical chamber, constituting a resonant cavity according to the Transverse Magnetic Mode (TM 010); this chamber is excited by ultra high frequency radiation means suitable to promote this mode of resonance, in particular a radiating antenna extending the length of chamber's axis or a radiating iris located on its median transverse plane, so that the electromagnetic field created in the cavity is composed of an electrical field whose lines of force are appreciably straight lines parallel to chamber's rotational axis, and of a magnetic field whose lines of force are appreciably circles centered upon this axis.

It should be noted that other modes of excitation are anticipated if need be, especially by inductive loops perpendicular to the planes of the magnetic field's lines of force. The mode of resonance may be yet different, constituted especially by the TM 110 mode, where the electrical field's lines of force are appreciably straight lines parallel to the rotational axis and the magnetic field's lines of force are curves, located in planes perpendicular to the axis and possessing a plane of symmetry passing throu.hg this axis.

In accordance with a preferred mode of use, the molds are arranged in stacks, superposed upon one another to form one or several columns situated the length of or around the chamber's rotational axis, in areas where the electromagnetic field is at a maximum and appreciably homogeneous.

Experiments have shown that such a method insures an identical treatment of all the lenses contained in the cavity, without sudden or periodic variation, and allows to insure an energy-transfer under optimal conditions to obtain lenses of remarkable optical quality, without risk of deformity or separation of matter in the polymerization process.

In accordance with another characteristic of the present invention, one preferably provides for ventilation of the chamber in order to avoid a temperature gradient within this latter. For the majority of polymerizable substances used, the chamber will be supplied with ultra high frequency waves so that the average energy density within this latter may be comprised between temperature $10^{-2}$ and $50 \times 10^{-2}$ cm$^3$/watts.

Under these conditions, the temperature around the molds is approximately homogeneous and below approximately 40° C.

The basic compositions used to make lenses are constituted in particular by a monomer or a mixture of monomers having a high-volume molecule, from the following group: hydroxy-ethyl methacrylate, hydroxy-propyl methacrylate, hydroxy-ethyl acrylate, ethylene glycol dimethacrylate, vinyl pyrrolidone N, methyl methacrylate, methacrylic acid.

Going by experimental observations, the results obtained are improved in the majority of cases by mixing with said basic composition initiator constituted in particular by azobis iso butyro nitril or hydro-peroxide or a peroxide, in weight proportion comprised between approximately 0.04% and 0.15%.

The invention extends to an apparatus for contact lens manufacture allowing to put to use the disclosed method; this apparatus essentially comprises generation means for ultra high frequency waves of predetermined frequency, a sealed metallic chamber, suitable to form a resonant cavity of a unique mode for the frequency of said waves, radiation reans coupling the wave generation means and said resonant cavity, and positioning means for several molds in said cavity, designed to allow arrangement of said molds in an appreciably homogeneous electromagnetic field area of said cavity.

The chamber of said apparatus may be especially of cylindrical form, with an inside diameter D such that:

$D = 2.29 \cdot 10^4/f \pm 1\%$ in the case of the TM 010 mode $D = 3.65 \cdot 10^4/f \pm 1\%$ in the case of the TM 110 mode where D is expressed in millimeters and where f is the wave frequency expressed in megahertz. (The frequency used being generally an industrial frequency: 2,450 Mhz, 915 Mhz, 434 Mhz . . . )

Moreover, the invention's apparatus is advantageously equipped with ventilation means fit to insure an external air-flow around the chamber, or even a blower system within this latter, combined with an air exhaust opening.

The invention's apparatus may include one chamber only or else several connected chambers so as to be submitted to an appreciably identical energy distribution.

The invention having been presented in its general form, other characteristics, goals, and advantages of this latter will emerge from the following description, which refers to the drawings herewith, furnished on non-restrictive grounds to illustrate the invention; on these drawings.

Figure 6:
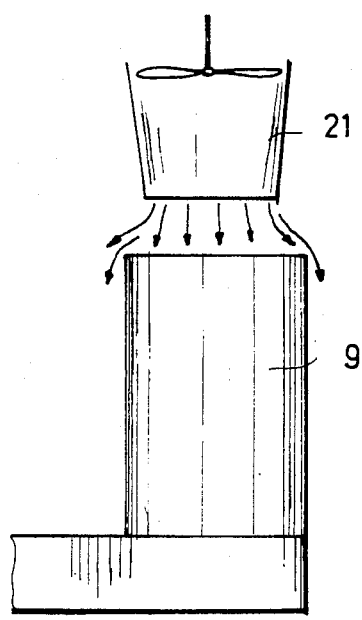
Figure 7:
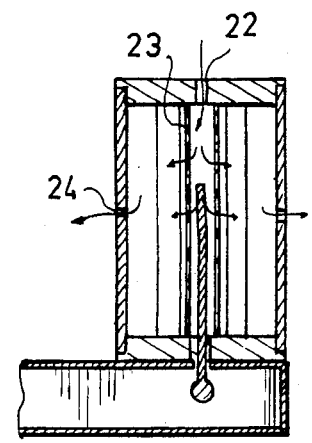
Figure 8:
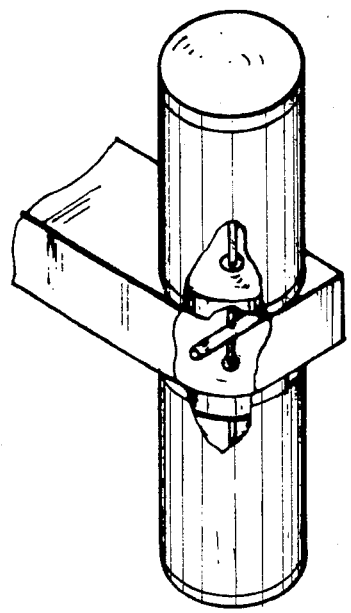
Figure 10:
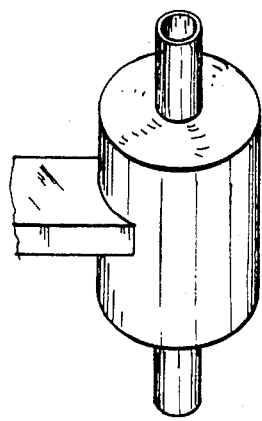
Figure 9:
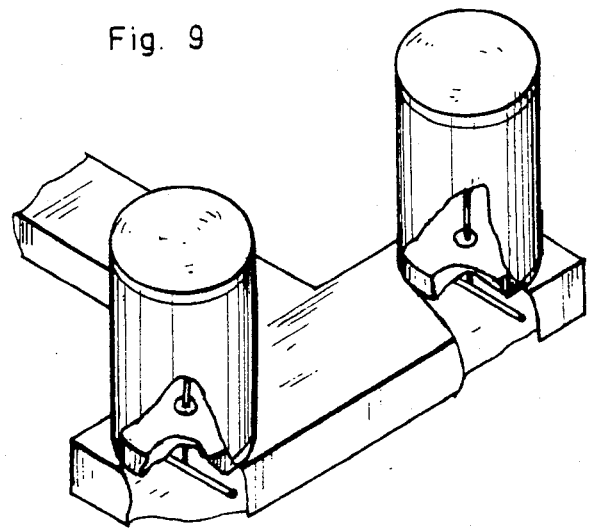

FIGS. 6 and 7 diagram two modes of realization of ventilation means connected to said chamber;

FIGS. 8 and 9 partially diagram other ways to construct the apparatus, equipped with several chambers;

FIG. 10 diagrams one other way to construct the apparatus;

FIGS. 11 and 12 are axial cross-sectional views of two variations of the apparatus diagrammed in FIG. 10.

Figure 1:
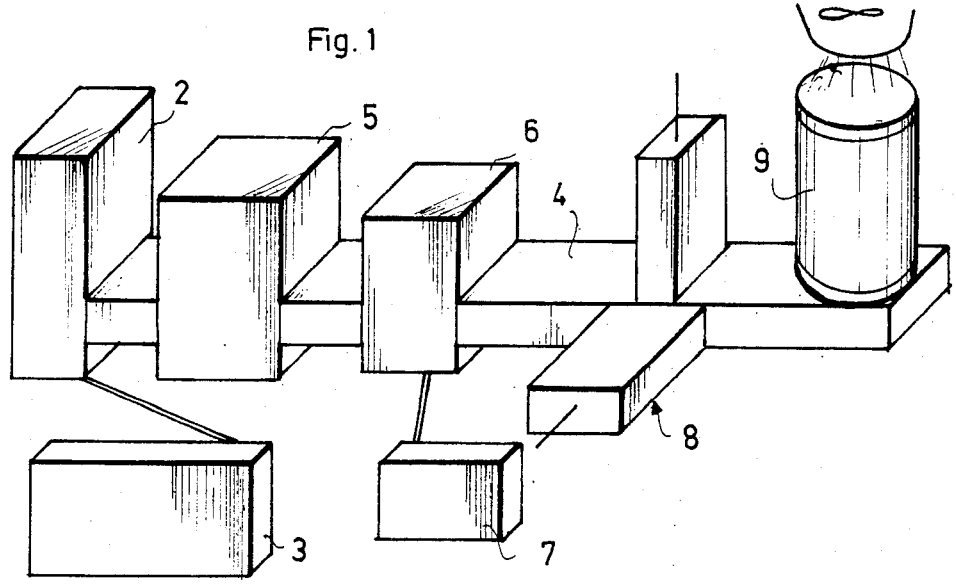
FIG. 1 is a diagrammatic view of a lens manufacturing apparatus according to the present invention.
Figure 2:
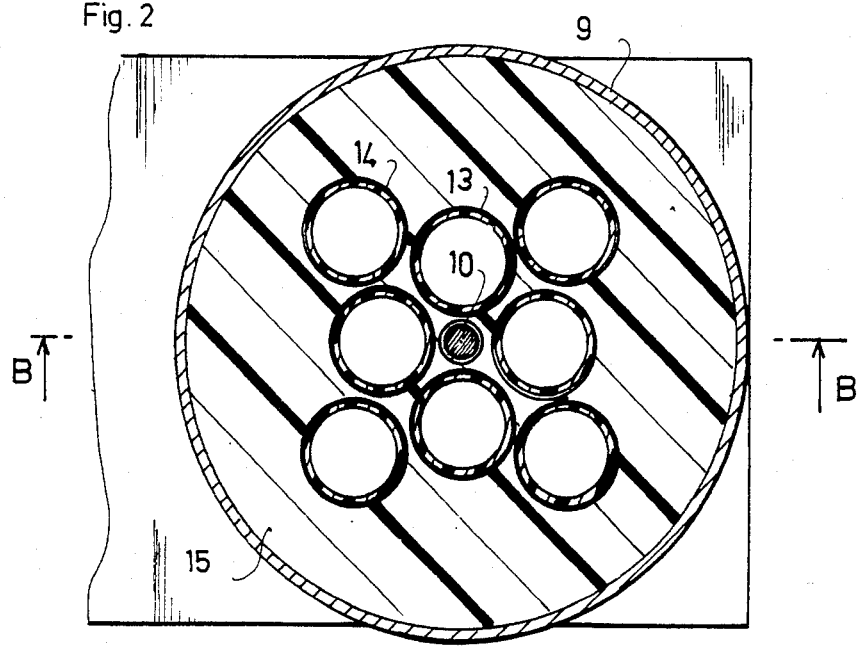
FIGS. 2 and 3 are respectively transverse cross-sectional view AA and axial cross-sectional view BB, of a chamber equipping said apparatus.
Figure 3:
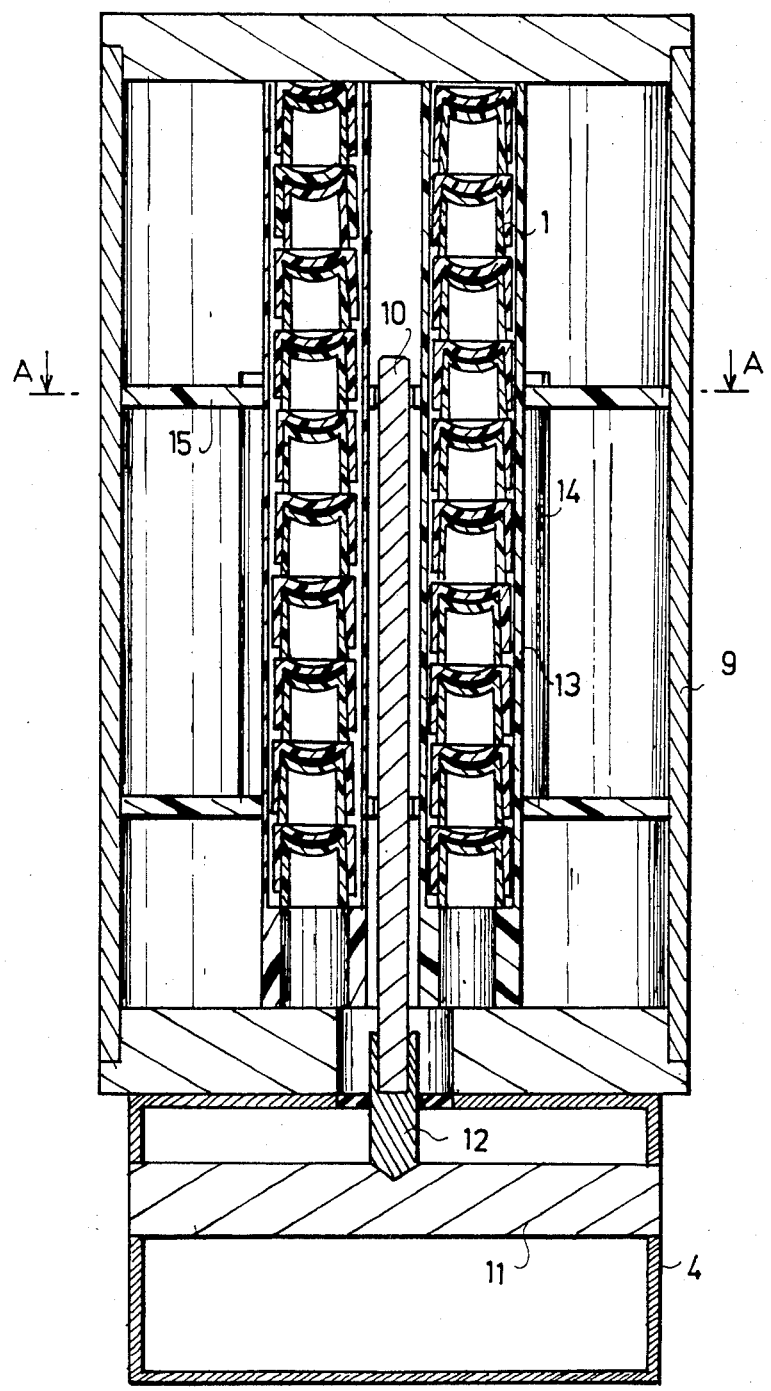

The apparatus shown as an example in FIGS. 1, 2, and 3 is intended for use in the molding manufacture of hydrophilic (or soft) contact lenses having, right after molding, all the required geometrical, mechanical, and optical characteristics without need for machining or other finishing operations.

To this end, one uses molds (shown superposed as part 1 of FIG. 3), which are each composed of two parts interlocking in a water-tight manner, to delineate a closed molding volume in which is placed an amount of basic composition designated to form a lens. Each part of the mold is made of material transparent with respect to ultra high frequency waves, especially of pure uncharged polypropylene, polyethylene, and polymethylpentene, and presents a volume and weight much greater than the portion of basic composition contained in the mold.

The invention aims toward an apparatus designed to carry out polymerization of several lenses under suitable conditions to obtain the perfect geometric and optical qualities of these latter. It includes a magnetron 2 connected to an electrical source unit 3, which generates ultra high frequency waves of determined frequency in a waveguide 4 of rectangular form suitable to allow propagation of the fundamental mode at the selected frequency.

Interposed the length of waveguide 4 are a circulator 5 allowing to divert the reflected wave toward an auxiliary load in order to protect the magnetron in case of a considerable increase in the stationary wave relation, a bicoupler 6 connected to a milliwattmeter 7 to control the value of this stationary wave relation and an adjustable E/H adapter 8, allowing to vary this relation in order to adjust it to a value near 1.

To that end, this adapter includes two variable short circuits, formed by metallic pistons which can be moved within the two lateral portions of the waveguide (one parallel to the electrical field, the other to the magnetic field).

At one end of guide 4 is connected a metallic chamber of cylindrical form 9, constituting a resonant cavity in accordance with the TM 010 mode.

This chamber 9, shown in a cross-sectional view in FIG. 3, is brass and is sealed at each end by a brass disk, the upper disk being removable. For a wavelength equal to 2,450 megahertz which is used in the following examples, its inside diameter D is substantially equal to 93.7 mm.

The chamber 9 is connected to guide 4 on which it is fastened by the interposition of a metallic axial antenna 10 which extends through a part of chamber's height (between about ⅔ to ¾ of this height). This antenna passes through an aperture cut in the chamber's lower disk to penetrate into the waveguide 4 through another aperture cut in this latter. At its end the antenna 10 is fastened to a crossbar 11 which is set in the guide 4 between the side walls of this latter.

In this instance, the antenna 10 is held by a metallic piece 12 soldered to the cross-bar 11 and guided by a polytetrafluoroethylene O-ring at the level of the guide's aperture; the end of antenna 10 is screwed into an eye-holes tapped in piece 12.

The molds 1 are arranged as shown in FIGS. 2 and 3, around antenna 10, superposed within eight columns. They are held in this position by tubular guides such as 13 or 14, made of a dielectric material transparent or barely absorbent with respect to ultra high frequency waves, especially of polytetrafluoroethylene or silicone. These guides possess an extra inside thickness at their base to form a stop for the lower molds. The inside diameter of these guides is slightly greater than the molds' outside diameter in order to contain these latter.

The tubular guides 13 and 14 are positioned in chamber 9, parallel to the axis of this latter, by two retainer disks such as 15 which are inserted edgewise against the inside circular chamber wall; these disks are made of the same material as guides 13 and 14 and include eight holes for passage of same. Guides 13 and 14 are hence removable and may be taken out for placement of molds within them and then inserted in the chamber in the appropriate, always identical positions thanks to retainer disks 15.

As shown in FIGS. 2 and 3, four central tubular guides such as 13 are arranged in the immediate vicinity of antenna 10 to extend almost to the chamber's height, while four peripheral guides such as 14 are arranged at the immediate circumference of central guides 13 to extend over a fraction of the chamber's height (at middle zone level).

The molds contained in these guides are thus arranged in superposed columns: four taller columns, located in the immediate vicinity of the antenna and diametrically opposed two-by-two, and four additional shorter ones arranged in the spaces separating the first around their exterior circumference, as shown in FIG. 2. The usable central volume occupied by these columns of molds represents a fraction of the total chamber volume.

Experiments have shown that this fraction could be on the order of one fourth of the total volume: the electrical field whose lines of force are straight lines parallel to the antenna and the magnetic field whose lines of force are concentric circles around these lines, are appreciably homogeneous in this volume, except in the upper and lower areas located above and below guides 14 (which explains that same are designed shorter so as not to extend into these areas).

Moreover, it has been determined in certain applications of the present method, that it is useful to provide for auxiliary dielectric loads in place of certain molds. These loads, made of an absorbent material with respect to the ultra high frequency waves, may be constituted by molds containing portions of basic composition, but the lenses obtained will afterwards be discarded by reason of their inferior quality compared to the others. These loads are useful to increase the homogeneity of the electromagnetic field at the level of the usable molds, while facilitating the adaptation of the unit to the load contained in the cavity in order to obtain a high energy yield (capable of reaching 90%). Tests have shown that these loads should be generally located at the base of guides 13 (taller guides).

Figure 4:
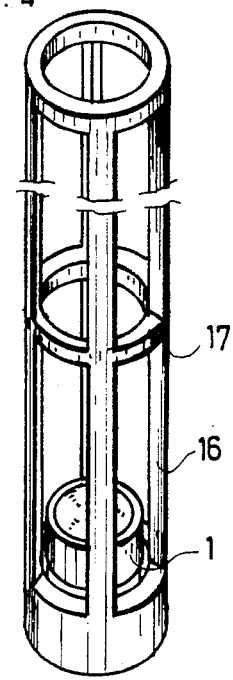
FIGS. 4 and 5 are perspective views, representing other ways to effect the positioning of molds within the chamber.

FIG. 4 presents another way to make a tubular guide; in this mode of construction the guide is latticed and the guiding of molds is insured by four uprights 16, braced by circular parts 17. It should be noted that one may, if need be, plan to use interlocking molds, so as to allow simplification or even complete suppression of the guides.

Figure 5:
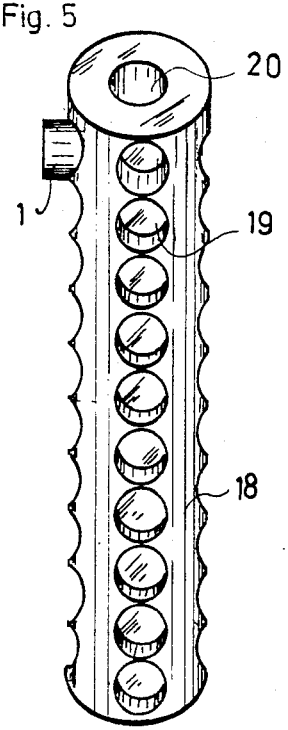

FIG. 5 presents (on a smaller scale) another realization of positioning means for the molds. The eight aforementioned guides are replaced by a single column 18 guide of an analogous material, transparent with respect to ultra high frequency waves), which possess transverse eye-holes such as 19, allowing one to place and secure the molds. These latter are then each superposed in a transverse position (FIG. 5 represents one of the molds in place). Column 18 is arranged as previously around the antenna which is placed in an axial aperture 20 of said column.

Moreover, with a view to avoiding the appearance of a temperature gradient due to an overheating and a convection within chamber 9, ventilation means allowing to cool the upper part of said chamber are preferably connected to the apparatus.

This ventilation may be insured by an exterior fan 21 (FIG. 6) axially arranged above chamber 9. This arrangement suffices to suitably limit the temperature gradient in cases where the load contained in the chamber is relatively small.

In the opposite case, one preferably anticipates a blower fit to create an air-flow within the chamber (FIG. 7). This flow is brought in through an axial aperture 22 in the upper disk, is guided by a central column 23 (of material transparent with respect to the ultra high frequency waves) which surrounds the antenna from one end of the chamber to the other, penetrated by holes cut in the upper part of column 23; exhaust openings 24 are provided in the chamber's cylindrical wall for the evacuation of air.

The apparatus may be equipped with a single chamber 9 as preferably described or with several identical chambers as shown in FIGS. 8 and 9.

The apparatus shown in FIG. 8 is equipped with two chambers connected by the same cross-bar at the end of the waveguide, these chambers being arranged symmetrically in relation to one another.

The apparatus shown in FIG. 9 is equipped with two chambers, connected by two cross-bars located in a segment of the waveguide that transversally extends the path waveguide. The two transverse bars are spread apart at a distance equal to the length of the guided wave. It is possible to put four chambers in place by combining the pairing-off of FIG. 8 to that of FIG. 9.

If need be, other pairings may be provided to set up a greater number of chambers and submit them to the same energy distribution.

Moreover, FIGS. 10, 11, and 12 diagram another mode of construction in which the chamber is connected to the end of waveguide 4 by a radiating iris 25. This iris is symmetrical in relation to the chamber's transverse median plane and is formed by a slit cut in the cylindrical wall of this latter.

For a chamber having the already indicated dimensions, the diameter of this iris is 34 mm and its expanded diameter from 50 to 60 mm, depending upon the load and node of use.

Furthermore, the chamber is perforated at the center of its upper and lower cylindrical walls by two apertures rimmed by guide flanges 26 and 27.

Molds of the type already mentioned are contained in a tubular central polytetrafluoroethylene guide 28 which runs through the chamber the length of its axis.

In the case of FIG. 11, the molds are motionless during processing and stopped in guide 28 at the center of the chamber by a ring 29 fastened in said column. After the processing, the tubular guide 28 is withdrawn from the chamber to replace the molds.

In the case of FIG. 12, the upper part of tubular guide 30 extends to a loader 31 composed of a tube containing molds and includes at its lower end an evacuation conduit 32 which deposits the molds on a conveyor belt 33. The molds thus run through the chamber, and processing is effected continuously. The conveyor belt speed is adjusted so as to leave molds the appropriate time within the usable central chamber volume.

Examples 1, 2, and 3 provided below were put to use by means of an apparatus with a chamber of the type represented in FIGS. 1, 2 and 3, with external ventilation of the type shown in FIG. 6. Examples 4 and 5 were put to use respectively in an apparatus such as the one shown in FIG. 11 and in an apparatus such as the one shown in FIG. 12. In each instance, the wavelength used was 2,450 megahertz and the chamber height was 294 mm.

EXAMPLE 1

Basic composition placed in each sealed mold:

| Basic composition placed in each sealed mold: | |
|---|---|
| Hydroxy ethyl methacrylate (Hema) | 72.14% (by weight) |
| Hydroxy propyl methacrylate (Hpma) | 23.73% |
| Hydroxy ethyl acrylate (Hea) | 2.00% |
| Ethylene glycol dimethacrylate (Egdma) | 0.05% |
| Polyvinyl pyrrolidone (PVP) | 2.00% |
| Azobis iso butyro nitril (AIBN) | 0.08% |

Weight of portion within each mold = 0.05 g
Number of usable molds placed in chamber = 36
Clean weight of each mold: 1.30 g
Number of auxiliary loads formed by molds containing lost portions: 12
Arrangement of auxiliary loads: in the lower part of guides 13.

After actuating the fan and the magnetron, the adapter 8 is set so that the energy reflected in guide 4

(measured by milliwattmeter 7) is at a minimum. One then obtains the following processing conditions:

$$\frac{\text{energy absorbed in chamber}}{\text{energy emitted by magnetron}} = .60$$

Average energy density in the chamber: 0.06 cm$^3$/watts
Ventilation air-flow: 100 liters/hour
Room temperature: 20° C.
Temperature on the inside surface of chamber wall: 30° C.
Processing time: 30 min.

At the end of processing, one obtains hyrophilic contact lenses, polymerized in uniform fashion, presenting no geometrical or optical defect and provided with perfectly formed thin edges. Each lens obtained is apt to absorb about 38% of water (by weight in relation to final weight of the hydrated lens).

EXAMPLE 2

This example aims toward a realization of very thin lenses having a thickness on the order of 5/100 mm at the level of the optical axis.

Basic composition placed in each sealed mold:

| Basic composition placed in each sealed mold: | |
| --- | --- |
| Vinyl Pyrrolidome N | 74.58% |
| Methyl methacrylate | 24.84% |
| Ethylene glycol dimethacrylate | 0.50% |
| Azobis iso butyro nitril | 0.08% | weight of portion within each mold: 0.040 g
Number of usable molds arranged in each chamber: 36
Clean weight of each mold: 0.85 g
Number of auxiliary loads formed by molds containing lost portions: 8
Arrangement of these auxiliary loads: in the lower part of guides 13.

One ascertains that the preceding setting of adapter 8 must be slightly modified by reason of the modification in the composition placed in the molds.

$$\frac{\text{energy absorbed in chamber}}{\text{energy emitted by the magnetron}} = 0.50$$

Average energy density in the chamber: 0.025 cm$^3$/watts
Ventilation air-flow: 100 liters/hour
Room temperature: 20° C.
Temperature on the inside surface of the chamber wall: 24° C.
Processing time: 90 min.

Despite their very slender thickness, one ascertains no deformities in the lenses and, as presently, these latter possess the quality of being fit for direct us (hydration rate: 70%).

EXAMPLE 3

| Basic Composition: | 2 hydroxy ethyl methacrylate | 99.91% |
| --- | --- | --- |
| | Azobis iso butyro nitril | 0.09% |

Weight of portion within each mold: 0.04 g
Number of usable molds arranged in the chambers: 56
Clean weight of each mold: 0.85 g
Number of auxiliary loads formed by molds containing lost portions: 16
Arrangement of auxiliary loads: in the lower part of guides 13

$$\frac{\text{energy absorbed in the chamber}}{\text{energy emitted by the magnetron}} = 0.60$$

Average energy density in the chamber: 0.045 cm$^3$/watts
Ventilation air-flow: 100 liters/hour
Room temperature: 20° C.
Temperature on the inside surface of chamber wall: 25° C.
Processing time: 45 min.

Same remarks as previously may be made regarding the quality of lenses obtained (hydration rate: 40%).

EXAMPLE 4

In this example, the basic composition is identical to that in example 1.

In tubular guide 28, five molds are superposed in a metrical fashion with regard to the chamber center. These molds are of polymethylpentene.

Weight of the portion in each mold: 0.02 g
Clean weight of each mold: 1.18 g $$\frac{\text{energy absorbed}}{\text{energy emitted}} : 50\%$$

Average energy density: 0.049 cm$^3$/watts
Processing time: 5 min.

At the end of this processing whose duration is very slight in comparison to the other examples, the lenses obtained are polymerized in uniform fashion, without geometrical or optical defect.

EXAMPLE 5

In this example, the basic composition, the portion weights and the weight and nature of the molds are identical to those of the preceeding example.

The molds are made to pass continuously through a tubular guide 30 at a speed on the order of 1 cm/min. (speed of conveyor 33). Each mold remains in the chamber about 30 min., the number of molds present in the chamber at each instant being about 14.

The energy absorbed/energy emitted yield and the average density are of the same order as those in the preceding example.

The same remarks may be made regarding the quality of lenses obtained.

We claim:

1. A method of manufacturing a contact lens of appropriate optical quality consisting of: constructing water-tight molds, reproducing, in the mold cavity, the shape of the lens desired and wherein said water-tight molds are composed of a substantially transparent material with respect to ultra high frequency electromagnetic waves, and said water-tight molds being constructed so as to possess a thermic inertia much higher than the portion of basic composition needed to make a lens;

preparing a basic composition starting with one or several monomers having double polymerizable bonds, and having an absorbent quality with respect to ultra high frequency waves;

insuring polymerization of the composition within the sealed molds, through irradiation by means of ultra high frequency waves;

said method being characterized in that the polymerization operation is realized by arranging several molds (1), each containing an amount of basic composition, within at least one sealed metallic chamber (9) constituting a resonant cavity of a unique mode for the frequency of the ultra high frequency waves used, said molds being positioned in an area of the cavity where the electromagnetic field is approximately homogeneous and being distributed so that the amounts of basic composition contained in said molds act as a load fitted to the inside of said resonant cavity.

2. Method according to claim 1, characterized in that the molds (1) are arranged in a chamber (9) possessing ring geometry, constituting a resonant cavity according to TM 010 or TM 110 modes, said chamber being excited so as to favor this mode of resonance.

3. Method according to claim 2, characterized in that the molds (1) are arranged in chamber (9) excited by ultra high frequency radiation means (10, 25) fit to generate an electromagnetic field composed of an electrical field whose lines of force are appreciably straight lines parallel to chamber's rotational axis, and of a magnetic field whose lines of force are curves located in planes perpendicular to the chamber's axis.

4. Method according to claim 3, characterized in that the molds (1) are arranged in stacks, superposed upon one another to form at least one column situated the length of or around the chamber's rotational axis (9), said column(s) being positioned in a usable central volume of chamber representing a fraction of this latter's total volume.

5. Method according to claim 4, characterized in that the molds are inserted in a resonant cavity according to the TM 010 mode and are arranged, on the one hand, as four stacks, called central columns, in the immediate vicinity of a radiating antenna (10) extending the length of chamber's axis, and on the other hand, as four additional stacks, called peripheral columns, arranged at the immediate circumference of the central columns, each peripheral column being set in the space separating the exterior circumference of the two neighboring central columns.

6. Method according to claim 5, characterized in that the molds (1) are arranged, on the one hand, as central columns in the immediate vicinity of the antenna (10) and extending almost the height of chamber (9), and on the other hand, as peripheral columns, arranged at the immediate circumference of central columns and extending over a fraction of chamber's height.

7. Method according to claim 4, characterized in that the molds are inserted in a resonant cavity according to the TM 010 mode excited by means of an iris (25), symmetrical in relation to the chamber's transverse median plane, said molds being arranged in a tubular central guide (28, 30) running through chamber the length of its axis.

8. Method according to claim 7, characterized in that the molds pass through central guide (30) at the appropriate speed so that each mold remains in the chamber's usable central volume the necessary time for processing.

9. Method according to claim 6, characterized in that one interposes in one of the columns of molds (1) auxiliary dielectric loads of an absorbent material with respect to ultra high frequency waves, so as to increase the homogeneity of the electromagnetic field at molds' level.

10. Method according to claim 2, characterized in that one insures ventilation a cooling of the upper portion of the chamber, to make the temperature homogeneous within this latter and to insure, at the level of the molds, a temperature lower than approximately 40° C.

11. Method according to claim 3, characterized in that chamber (9) is supplied with ultra high frequency waves so that the average energy density within this latter may be comprised between approximately $10^{-2}$ and $50 \times 10^{-2}$ cm$^3$/watts.

12. Method according to claim 1, in which the basic composition is a monomer or a mixture of monomers, having a high volume molecule, from the following group: hydrox ethyl methacrylate, hydroxy propyl methacrylate, hydroxy ethyl acrylate, ethylene glycol dimethacrylate, vinyl pyrrolidone N, methyl methacrylate, methacrylic acid characterized in that one mixes with said basic composition an initiator made in particular of azobis iso butyro nitril, or a hydro-peroxide or a peroxide, in weight proportion comprised between approximately 0.04% and 0.15%.

* * * * *

UNITED STATES PATENT AND TRADEMARK OFFICE
CERTIFICATE OF CORRECTION

PATENT NO. : 4,495,117
DATED : January 22, 1985
INVENTOR(S) : Bernard Feurer

It is certified that error appears in the above-identified patent and that said Letters Patent is hereby corrected as shown below:

On the title page, item (19) "Feurer et al." to read --Feurer--.

In the designation of inventors, cancel "; Gilles Pigot, Toulouse, both of" and insert --,-- therefor.

Signed and Sealed this

Ninth Day of July 1985

[SEAL]

Attest:

DONALD J. QUIGG

Attesting Officer

Acting Commissioner of Patents and Trademarks